United States Patent [19]
Anand

[11] Patent Number: 5,426,688
[45] Date of Patent: Jun. 20, 1995

[54] TELECOMMUNICATION ALARM METHOD AND SYSTEM

[76] Inventor: Vivodh Z. J. Anand, 592 Ridgewood Ave., Glen Ridge, N.J. 07028

[21] Appl. No.: 60,077

[22] Filed: May 12, 1993

[51] Int. Cl.⁶ .......................... H04M 1/24; H04J 1/16; H04J 3/14
[52] U.S. Cl. .......................................... 379/5; 379/10; 370/13; 370/14; 370/15
[58] Field of Search ...................... 375/1, 5, 27, 29, 33, 375/10, 12, 15; 370/13, 14, 15; 371/29.1, 23, 2.1

[56] References Cited

U.S. PATENT DOCUMENTS

| | | | |
|---|---|---|---|
| 4,435,704 | 3/1984 | Hashimoto et al. | 370/15 X |
| 4,446,551 | 5/1984 | Seo | 370/16 |
| 4,491,838 | 1/1985 | West | 340/825.05 |
| 4,551,718 | 11/1985 | Cookson | 340/825.16 |
| 4,688,208 | 8/1987 | Kawaguchi | 370/15 |
| 4,774,510 | 9/1988 | Steinke | 340/825.17 |
| 4,841,520 | 6/1989 | Steely | 370/13 |
| 5,036,318 | 7/1991 | Bachhuber | 340/825.16 |
| 5,111,497 | 5/1992 | Bliven | 379/27 |
| 5,301,050 | 4/1994 | Czerwiec et al. | 379/27 X |

OTHER PUBLICATIONS

W. Stallings "ISDN, An Introduction" Macmillan Publishing Company, 1989, pp. 397–405.

*Primary Examiner*—Stephen Chin
*Assistant Examiner*—Paul Loomis
*Attorney, Agent, or Firm*—Lerner, David, Littenberg, Krumholz & Mentlik

[57] ABSTRACT

A Public Switched Telecommunications Network (PSTN) including trunks connecting SPC switches and having a common channel signalling network with SPs, STPs, and SCPs, with each of the SPs connected to an MCC which is connected to an MMOC forming part of an SCC which includes a critical indicator panel which mirrors system alarm signals at the MCC. Connected to the PSTN is a monitoring center associated with monitored premises having sensing devices connected to an interface at the premises. The interfaces and SPs are connected by two full duplex channel data links which are continuously subjected to loop back testing which is connected to provide at the MCC an alarm signal to identify any interruption in the communication through the SP and trunks connected thereto and also to provide at the MCC a signal of interruption of a data link connected to the first SP. An adjunct processor is provided at an SCC connected to a plurality of MCCs. The adjunct processor receives from the signalling device at the MCC a signal indicating a break in a link and this through the adjunct processor initiates a connection between the SCC and monitoring center to send to the monitoring center an indication of the identity of a monitored premise wherein a break in the data link has occurred.

22 Claims, 1 Drawing Sheet

TELECOMMUNICATION ALARM METHOD AND SYSTEM

TECHNICAL FIELD

The present invention relates to alarm systems for security monitoring and more particularly relates to systems utilizing facilities of the Public Switched Telephone Network (PSTN) to provide the necessary connectivity.

A conventional alarm system for home or business is coupled to the customer premise telephone line to deliver, via telecommunication, signals representing sensor outputs at various premise locations. Different sensors are triggered by various events to generate appropriate indicating signals. For example, if a window is open or if a fire alarm goes off the system automatically dials the alarm company to report such occurrence.

In the event of a burglary in which the telephone line is cut, no signals can be transmitted to report to the system that the building is under attack. Such a contingency, as well as a break in the telephone line for whatever cause, is handled conventionally by providing a copper line, i.e., a dedicated pair of wires, separate from standard telephone service or POTS lines, from the premise that is under surveillance to the alarm company location. This dedicated line is provided with specialized polling apparatus at both ends for periodically checking the integrity of the line. While this arrangement is effective, the separate metallic circuits and equipment must be dedicated exclusively to this purpose and are cost prohibitive to maintain. This disadvantage plus the tendency of dedicated wire circuits toward obsolescence has led to a movement to substitute arrangements which mainly rely on radio technology. While this approach may provide some potential cost relief it simultaneously raises reliability questions. Further, the radio alternative may require security companies to procure and maintain radio equipment.

The functional requirements of a satisfactory connectivity assurance system include the following. Security service companies need a reliable and not easily compromised detection capability in the local loop between the security company customer premises and the serving wire center or end office of the PSTN in instances where that network is utilized. This local loop should be relatively immune to erroneous momentary interruption messages, unannounced maintenance interruptions, or other breaks in the service connection. This requirement is generally supplied by incorporating a break detection capability which may be either a stand alone capability or may be provided as an option in conjunction with alarm message transmission capability. If stand alone, the system must be compatible with existing switched network customer premises alarm message transmitting devices including digital communicators such as automatic dialers.

The method of delivering a break message from the Local Exchange Carrier (LEC) to the alarm company should provide technical and economic flexibility and be subject to implementation by existing network facilities such a private lines or switched network.

The break detection mechanism must not interfere with the use of the customer telephone line for transmission of voice, data or alarm messages, i.e., the detection mechanism must be transparent to these other communications functions. Ubiquitous service is desirable and the system should permit deployment of the same technology throughout a geographic region. The architecture and methodology should be compatible with evolving network improvement.

BACKGROUND ART

Various approaches to ensuring circuit integrity have been proposed and certain of these circuits are described, by way of example, in the following described patents:

Bliven et al. U.S. Pat. No. 5,111,497, issued May 5, 1992, and assigned to Raychem Corporation, discloses an alarm and test system for apparatus that transmits and receives multiple telephone transmission signals over a single twisted pair wire. A digital main line system is provided that includes a line card at central office facilities and a remote terminal at a subscriber station. Multiple signals can be transmitted in digital form from the line card to the remote terminal location. The line card converts conventional analog signals to 2B1Q signals for transmission and the remote terminal converts the signals back to analog for use with conventional subscriber equipment.

A remote terminal emulator, having a predefined data pattern, may be provided at the central office facilities. As a means for detecting line card failures, comparison is made of a response of the line card with the emulated output. The test system may include a voltage source current monitor attached to the twisted pair to detect failures in the twisted pair and generate ring and test request voltage for checking parts of the line card. Failures at the remote terminal may be detected by providing a line card emulator.

Various other testing functions may be provided. A voice frequency emulator, connected to the line card or line card emulator, may be included to convert to a digital signal for transmission over the twisted pair to the remote terminal. The function of the line card, the twisted pair or the remote terminal, can be evaluated by measuring a returned amount of noise or reflected signal. Further testing procedures include testing digital-to-analog conversion equipment at the remote terminal and testing of a ring signal at the remote terminal.

Also disclosed is the structural arrangement of the remote terminal enclosure. Various test access ports, sockets and plugs are depicted.

Seo U.S. Pat. No. 4,446,551, issued May 1, 1984 and assigned to Kabushiki Kaisha Meidensha, discloses a data transmission system having two transmitting line loops connecting a master station and a plurality of remote slave stations. The system can detect a portion of a line where a break or equivalent malfunction occurs and form a loop back to permit continuation of the transmission function.

The master station transmits signals in opposite directions to the first and second lines. Each remote station and master station captures or relays and generates data received, as transmitted through the first and second transmitting lines. The remote station responds to the received information and transmits the information contained in the data signal to the neighboring station. The method of data transmission involves interrupting the relaying and generating in the first transmitting line, and shifting a gate. Each station comprises one serial/-parallel converter circuit. Each station has two sets of transmitters and receivers responding to the dual transmitting lines. Each remote station has two sets of retrigger timers having different durations and responsive to the first and second transmitting lines to determine whether or not a transmitting signal exists.

In the event of a break in a transmitting line, there is a shift in the output status of a timer in a station connected with the line. In response to the shift, dummy data are transmitted to the neighboring station remote station. All remaining remote stations beyond the break are placed in a non-signal condition. The remaining stations time out and shift back to the original output status as dummy data has been transmitted. The station connected to the line break does not shift back since there has been no data transmitted thereto due to the line break. The master station can thus recognize the location of the line break and form a loop back for data transmission without the section of line including the break.

Bachhuber et al. U.S. Pat. No. 5,036,318, issued Jul. 30, 1991, and assigned to Siemens Aktiengesellschaft, discloses a modularly structured comprehensive ISDN communication network which includes multiple test facilities. Included are a centrally located through-connection module which comprises a digital switching matrix array and a central control device, and operation and data modules at peripheral system locations that fulfill specific tasks by means of individual program controls using multi-processor arrangements.

Special hardware and software modules assure that various components of the system are in a constant ready state. Testing objectives include trouble recognition, trouble localization, trouble evaluation and trouble reports. A dependability sub-module, which is specifically adapted to hardware structure and program operation, is provided for each module. A hierarchy is established among the various dependability sub-modules in the system, the through-connection module having central significance.

The central system dependability systems sub-module is provided with error outputs from the individual sub-modules. The error outputs include texts indicating type of error, location of error and, if possible, cause of error. Particulars may be included, such as point in time of the occurrence of an error, initiated or recommended recovery measures, or error-explaining auxiliary data which are either hardware-oriented or software-oriented. Arbitrary user-specified text signals can be generated and outputted. Error reports are compiled based on defined ordering criteria. Display of error information is available at arbitrary error output equipment in prioritized fashion.

West U.S. Pat. No. 4,491,838, issued Jan. 1, 1985, and assigned to IBM, discloses a multiterminal processing system including a digital communication network with a digital switch as its central terminal in a star configuration. Input from each terminal is switched back to the next terminal in the loop network. Activity in the loop is monitored at the digital switch. In the event of a failure, the monitor can determine the failing terminal in the loop by use of a binary search around the loop. A loop failure is automatically isolated and bypassed. The starloop switch can configure subsections of the network into point-to-point, star, or multipoint modes.

Cookson et al. U.S. Pat. No. 4,551,718, issued Nov. 5, 1985, and assigned to Tetragenics, Inc., discloses a communication system for transmitting, over a single communication channel, status information relating to each of a plurality of power devices in an electrical power distribution system. At each location a monitoring device is provided for monitoring the state of a plurality of relays or other devices that are capable of being in either an active or inactive state. A digital signal representative of the monitored states is produced and processed for transmission. A receiver at a second remote location compares the transmitted information with a stored table to verify the validity of the coded information. If invalid, an alarm signal is generated at the second location and maintained until a valid code is received.

Steinke U.S. Pat. No. 4,774,510, issued Sep. 27, 1988, and assigned to Electrocon, Inc., discloses a monitoring annunciator apparatus for centralized monitoring of remotely positioned alarm contacts in order to permit a control room operator to visually scan a display panel to assess the status of the monitored alarm points. The apparatus utilizes a single signal wire for each monitored contact point and a ground wire common to all monitored contact points to provide notification through separate audible and visual indication of both the occurrence of a change in the status of each monitored field contact point, through the issuance of a contact alarm, and an indication of the occurrence of a change in the integrity of each wire pair, through the issuance of a line alarm, and implementation of corrective measures to return the field contact points and associated wire pair to normal status.

Steely U.S. Pat. No. 4,841,520, issued Jun. 20, 1989, and assigned to AMP Incorporated, discloses a data transmission system which utilizes multiplex techniques to transmit data signals among interface circuits. A central controller is coupled to a bus and applies clock signals thereto. The controller also receives data signals from the bus and applies data signals to the bus. A plurality of remote stations are coupled to the bus. A first such remote station counts the clock signals and can apply first a data signal to the bus during a time period corresponding to a first selected count. A second such remote station counts the clock signals and can receive a second data signal from the bus during a time period corresponding to a second selected count.

A fault detection system is provided to detect a failure of the bus and, in response thereto, prevent the clock signals from being transmitted to the second remote station. A plurality of parallel buses may be provided from the central controller, each to a respective subset of the remote stations. If an individual bus fails clock pulses are prevented from being carried to the subset associated with the failed bus.

While the above described systems address similar problems the solutions are dependent on comprehensive systems not readily or economically available at the present time.

DISCLOSURE OF THE INVENTION

The invention is preferably embodied in a Public Switched Telecommunications Network (PSTN) which includes Stored Program Controlled (SPC) switches connected by trunks, and a common channel signalling network connected to Signalling Points (SPs) comprised by at least certain of the SPC switches. The SPs are connected to multiple Signalling Transfer Points (STPs) which are redundantly interconnected and connected to Signal Control Points (SCPs). Each of the SPs are connected to a Master Control Center (MCC) which is connected to a Mini Maintenance Operation Center (MMOC) forming part of a Switching Control Center (SCC). The SCC includes a Critical Indicator Panel (CIP) which mirrors system alarm signals at the MCC. Operating with this PSTN the invention comprises providing a monitoring center associated with a plurality of monitored premises each having at least one sensor connected to an interface at the premises. A data link which includes two full duplex channels is provided between each such interface and a first SP. Means are provided for continuously conducting loop back testing of the data link between the first SP and the interfaces to detect any interruption of a link. Redundant trunk and line connection is provided between the first SP and the monitoring center as well as redundant common channel signalling connectivity between the first SP and the SP which serves as an end office for the monitoring center. An MCC is provided at the first SP to provide an alarm signal to identify any interruption of communication through the first SP and trunks connected thereto. The MCC also includes signalling means to identify any interruption of a data link connected to the first SP. An SCC is provided connected to a plurality of MCCs so as to provide at the MCC a trouble signal to indicate an interruption in the trunk and line connection between the first SP and the monitoring center and to provide at the MCC a link interruption signal to identify an interruption in the link between the first SP and the monitored premises. An adjunct processor is provided at the SCC means responsive to the trouble and link interruption signals. Upon receiving such a link interruption signal the adjunct processor initiates a connection from the SCC to the monitoring center. Such connection may be via redundant trunk and lines or may be via redundant common channel signalling links and STPs.

BEST MODE FOR CARRYING OUT THE INVENTION

Figure 1:
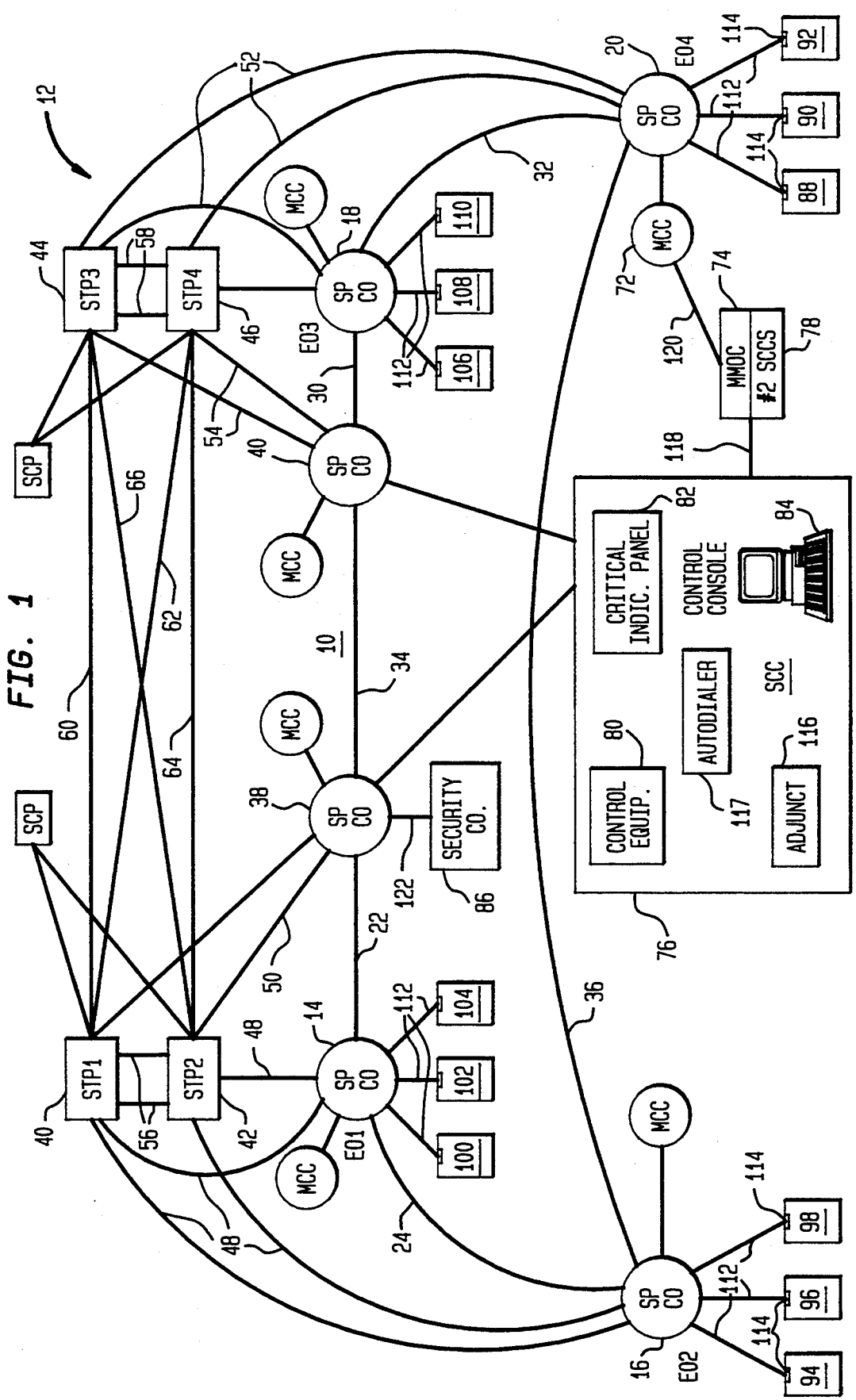
FIG. 1 of the drawing illustrates in block diagram form a Public Switched Telecommunications Network (PSTN) with the system of the invention incorporated into the network.

Referring to FIG. 1 there is shown a block diagram of a Public Switched Telephone Network (PSTN) and the SS7 network that is used to control signaling for the switched network. The analog and/or digital switched telephone network is generally indicated at 10 having a common channel signaling network in the form of an SS7 network illustrated generally at 12. The switched telephone network consists of a series of Central Offices (COs) which are conventionally referred to as Signaling Points (SPs) in reference to the SS7 network. Certain of these SPs comprise end offices (EOs) illustrated at 14, 16, 18 and 20.

The SS7 network 12 comprises a series of Signal Transfer Points (STPs) shown here at 40, 42, 44 and 46 designated STP1, STP2, STP3 and STP4. Each STP in the network is connected to the SPs in the network by A links indicated at 48, 50, 52 and 54. STP1 and STP2 constitute a mated pair of STPs connected by C links 56 while STP3 and STP4 constitute a mated pair connected by C links 58, each mated pair serving its respective transport area. It will be understood that there may be multiple mated pairs per region, one for each designated transport area. STP1 is connected to STP3 by B link 60 and to STP4 by D link 62. STP2 is connected to STP4 by B link 64 and to STP3 by D link 66. As will be understood, the A, B, C and D links are physically identical.

The STPs are connected to Signal Control Points (SCPs) indicated in FIG. 1 as an SCP 68 and an ISCP 70. The ISCP is an integrated Signaling Control Point, which is basically the same as an SCP but comprises a larger and more powerful computer. The ISCP may hold application information as well as routing information whereas an SCP contains routing information, i.e., routing tables.

The SS7 network constitutes a highly redundant data network, generally a 56K switched data circuit. By way of example, an SS7 message from End Office 16 to End Office 20 might travel any one of 8 possible routes. It could go from 16 to STP1, from STP1 to STP3, STP3 to 20. One variation on that route would be from STP1 down the D link 62 to STP4 to 20, and so forth. In the event that a link between STP3 and EO4 was lost, an SS7 route could be established from End Office 18 to End Office 20 via STP1 to STP3 and then via C link 58 to STP4 to 20. However, that would be an undesirable route in unnecessarily using the C link. A links provide direct connectivity while C links provide circuitous routes using extra switches, a situation to be avoided. An alternate route would be from STP1 via D link 62 to STP4 to 20.

Maintenance for the Public Switched Telephone Network (PSTN) is supported by a Master Control Center (MCC) associated with each Stored Program Control Switch (SPCS). An MCC normally constitutes a frame of equipment in a 5ESS or the like system with indicator lamps to indicate the current state of the office equipment and a keyboard input having keys for operating controls. FIG. 1 shows an illustrative MCC 72. The MCC is connected to a Mini Maintenance Operation Center (MMOC) 74 which forms part of a Switching Control Center (SCC) 76. Each SCC may be connected to several MCCs and their associated Stored Program Control Switches (SPCSs). The SCC 76 contains control equipment 80, a critical indicator panel 82 and a control console 84 including a monitor and control keyboard. The data indicating equipment status which is displayed and available at the MCC 72 and similar data available at other MCCs connected to the SCC 76 is displayed on indicator lamps on a wall mounted Critical Panel Indicator (CPI) within view of SCC personnel. Using the console, a technician can operate the MCC controls from the SCC.

As has been previously described, it has been conventional to connect a security company monitoring center, such as indicated at 86, to monitored premises such as 88-110 via a dedicated circuit. According to the present invention it has now been found that it is possible to effectuate the same purpose at reduced expense and equal reliability via the PSTN without the necessity of relying on dedicated circuitry or its equivalent. According to the preferred embodiment of the invention this is accomplished by utilizing Integrated Services Digital Network (ISDN) links 112 to connect the monitored premises 88-110 to the end offices 14, 16, 18 and 20 in the PSTN.

The Integrated Services Digital Network (ISDN) is a relatively newly developed and emerging field of telecommunications which integrates computer and communications technologies to provide a common, all-digital network. This is based in part on standardizing the structure of digital protocols developed by the International Telegraph and Telephone Consultative Committee (CCITT) so that, despite implementation of multiple networks within national boundaries, from a user's point of view there is a single, uniformly accessible, worldwide network capable of handling a broad range of telephone, data and other conventional and enhanced services. For details and for an extensive bibliography of references on ISDN, see Stallings, *ISDN, AN INTRODUCTION,* Macmillan Publishing Company, 1989.

Basic ISDN service consists of two full duplex 64 KB per second B channels and a full duplex 16 KB per second D channel. For the purposes of the invention the ISDN links 112 which are used for the local loop connection in this hybrid network of the invention minimally need only a B and a D channel. The monitored or customer premises 88–110 are connected to the ISDN links by NT1 interfaces 114 which in turn are connected to line cards at the central offices 14, 16, 18 and 20. Each ISDN link of this type is continuously subjected to loop back testing by its nature. Any break in the loop or loss of communication between the central office and monitored premises is indicated at the panel of the involved CO switch as well as at the indicator panel of the associated SCC, such as SCC 76. This indication identifies the particular premise and link where the loss of communication has occurred.

According to the invention the SCC critical indicator panel 82 is associated with an adjunct processor 116 which monitors the condition of the links 112 as those links may appear in alarm systems and indicators on the critical indicator panel 82. On detecting the occurrence of such an alarm or break in communication indication the adjunct 116, which may comprise a 386 or 486 processor, initiates notification to the security company 86. This notification may take any of several forms, such as by causing the automatic dialing of the security company and delivery of a coded signal or message indicating a break in communication with the monitored premise, identified in the coded signal. The maintenance network also conventionally monitors the central offices to provide an indication at the MCC of any break in the network at the offices which it monitors or with which it is associated, or any break in the interconnecting trunks or lines.

According to this preferred embodiment of the invention the adjunct 116 upon detecting an alarm at the critical indicator panel 82 activates an autodialer 117 to establish connection with the monitoring center 86 via the trunk circuits 118, 120, 36, 24, 22 and the local loop 122. It will be apparent that alternate trunk routes could be utilized, such as by way of example, via trunks 32 and 30 to local loop 122. Once trunk and line connection is established the adjunct processor automatically transmits a data message coded to notify the monitoring center that the break has occurred and the identity of the premise.

As an alternative embodiment of the invention the security company may be notified of a break in communication in the local loop to any monitored premise via the common channel signaling SS7 network generally indicated at 12 in FIG. 1. According to this embodiment of the invention a selected SCP such as the SCP 70 is provided with an instruction data base to respond to a TCAP message from an SP such as the SP 20 by directing an SS7 data signal to the SP 38 associated with the monitoring center 86, whereupon SP 38 sends via local loop 122 a data signal indicating a failure of communication in the particular data link 112 identified in the TCAP signal. Thus, as in the preferred embodiment previously described using the trunk network, notification is dispatched to the monitoring center. According to this alternate embodiment the SCC 76 through its adjunct processor 116, reacts to a communication break detected in one of the data links 112, such as the link to monitored premise 92, by forming and dispatching to the SP 20 a data signal coded to identify the link 112 to premise 92 to cause the SP 20 to format an appropriate TCAP signal which is transmitted over the SS7 link 52 to STP 44. STP 44 thereupon formats an SS7 data signal for transmission over the SS7 network to SP 38 which is the end office for the monitoring center 86. The link between STP 44 and SP 38 may be via D link 66 and link 50 or, alternatively, via links 60, and link 50. Upon receiving this SS7 message, the SP 38 transmits a data message over local loop 122 to the monitoring center 86 notifying of the communication break in the data link 112 to premise 92.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

I claim:

1. A method of monitoring the connection between a monitoring center and a monitored premises comprising:
   (a) providing a monitoring center;
   (b) providing a plurality of monitored premises each having sensor means connected to an interface at said premises;
   (c) providing data link means between each said interface and first switching point (SP) wherein said data link means includes two full duplex channels;
   (d) continuously conducting loop back testing of said data link means between said first SP and said interfaces to detect any interruption of a link;
   (e) providing redundant trunk and line connection between said first SP and said monitoring center;
   (f) providing master control center (MCC) means at said first SP to provide an alarm signal identifying any interruption of one of said a data link means connected to said first SP and to provide an interruption signal;
   (g) providing switching control center (SCC) means connected to a plurality of MCC means to receive said said interruption signal and provide a trouble signal in response to said interruption signal;
   (h) providing at said SCC means adjunct processor means responsive to said trouble signal; and
   (i) transmitting said alarm signal from said adjunct processor means to said monitoring center to identify an interruption in signalling continuity between an identified monitored premise and said monitoring center.

2. A method according to claim 1, wherein said transmitting step is initiated by automatic dialing at said SCC means.

3. A method according to claim 1, wherein said data link means comprises an ISDN link including at least one B and one D channel.

4. A method of monitoring the connection between a monitoring center and a monitored premises comprising:
   (a) providing a monitoring center;

(b) providing a plurality of monitored premises each having sensor means connected to an interface at said premises;
(c) providing data link means between each said interface and a first switching point (SP) wherein said data link means includes two full duplex channels;
(d) continuously conducting loop back testing of said data link means between said first SP and said interfaces to detect any interruption of a link;
(e) providing redundant common channel signalling connectivity between said first SP and an SP which serves as an end office for said monitoring center;
(f) providing master control center (MCC) means at said first SP to provide an alarm signal to identify any interruption of communication through said data link means;
(g) providing switching control center (SCC) means connected to a plurality of MCC means to receive said alarm signal and to provide at said SCC means a trouble signal to indicate an interruption of communication through a data link means between said first SP and said monitored premises;
(h) providing at said SCC means adjunct processor means responsive to said interruption signal;
(i) initiating in response to an interruption signal a TCAP signal from said first SP to an STP which includes a data base related to the monitoring center;
(j) dispatching from said STP to the SP serving as end office to said monitoring center a data signal encoded to identify the data link wherein communication has been interrupted;
(k) delivering from said end office SP to said monitoring center a data signal identifying the data link to the monitored premise wherein the communication break has occurred.

5. A method according to claim 4, wherein said data link means comprises an ISDN link including at least one B and one D channel.

6. A method of monitoring the connection between a monitoring center and a monitored premises comprising:
(a) providing a monitoring center;
(b) providing a plurality of monitored premises each having sensor means connected to an interface at said premises;
(c) providing data link means between each said interface and a first SP wherein said data link means includes two full duplex channels;
(d) continuously conducting loop back testing of said data link means between said first SP and said interfaces to detect any interruption of a link;
(e) providing redundant connection between said first SP and said monitoring center;
(f) providing master control center (MCC) means at said first SP to provide a first alarm signal to identify any interruption of communication through said first SP and trunks connected thereto;
(g) providing at said MCC means signalling means to provide a second alarm signal to identify any interruption of a data link means connected to said first SP;
(h) providing switching control center (SCC) means connected to a plurality of MCC means to receive said alarm signals and to a trouble signal in response to said alarm signals;
(i) providing at said SCC means adjunct processor means responsive to said trouble signal;
(j) initiating in response to a trouble signal a trunk and line connection from said SCC means to said monitoring center, and
(k) transmitting over said connection a signal identifying an interruption in signalling continuity between an identified monitored premise and said monitoring center.

7. A method according to claim 6, wherein said data link means comprises an ISDN link including at least one B and one D channel.

8. A method of monitoring the connection between a monitoring center and a monitored premises comprising:
(a) providing a monitoring center;
(b) providing a plurality of monitored premises each having sensor means connected to an interface at said premises;
(c) providing data link means between each said interface and a first switching point (SP) wherein said data link means includes full duplex channels;
(d) continuously conducting loop back testing of said data link means between said first SP and said interfaces to detect any interruption of a link;
(e) providing connection through a Public Switched Telecommunications Network between said first SP and said monitoring center;
(f) providing master control center (MCC) means at said first SP to provide a first alarm signal to identify any interruption of communication through said first SP and trunks connected thereto;
(g) providing at said MCC means signalling means to provide a second alarm signal to identify any interruption of a data link means connected to said first SP;
(h) providing switching control center (SCC) means connected to a plurality of MCC means to receive said alarm signals and to provide a trouble signal in response to said alarm signals;
(i) providing at said SCC means adjunct processor means responsive to said trouble signal;
(j) initiating in response to a trouble signal a trunk and line connection from said SCC means to said monitoring center, and
(k) transmitting over said connection a signal identifying an interruption in signalling continuity between an identified monitored premise and said monitoring center.

9. A method according to claim 8, wherein said data link means comprises an ISDN link including at least one B and one D channel.

10. In a Public Switched Telecommunications Network (PSTN) including Stored Program Controlled (SPC) switches connected by trunks, and a common channel signalling network connected to Signalling Points (SPs) comprised by at least certain of said SPC switches, each said SP being connected to a Master Control Center (MCC) with at least one MCC being connected to a Switching Control Center (SCC), the improvement comprising:
(a) a monitoring center;
(b) a plurality of monitored premises each having sensor means connected to an interface at said premises;
(c) data link means between each said interface and a first switching point (SP) wherein said data link means includes two full duplex channels;
(d) means associated with said data link means for continuously conducting loop back testing of said data link means between said first SP and said interfaces to detect any interruption of a link;

(e) signalling means at said MCC means for identifying any interruption of a data link means connected to the SP associated with said MCC means;

(f) signaling means at said SCC associated with said signalling means at said MCC to signal at said SCC an interruption in said link means;

(g) adjunct processor means at said SCC means responsive to said link interruption signal to initiate from said SCC means a connection from said SCC means to said monitoring center to provide at said monitoring center a signal identifying an interruption in signalling continuity between an identified monitored premise and said monitoring center.

11. A system according to claim 10, wherein said connection between said SCC and said monitoring center is initiated by automatic dialing at said SCC means.

12. A system according to claim 10, wherein said data link means comprises an ISDN link including at least one B and one D channel.

13. A system according to claim 10, wherein said signal from said adjunct processor means initiates in response to an interruption signal a TCAP signal from said first SP to an STP which includes a data base related to the monitoring center;

said STP dispatching to the SP serving as end office to said monitoring center a data signal encoded to identify the data link wherein communication has been interrupted and delivering from said monitoring center end office SP to said monitoring center a data signal identifying the data link to the monitored premise wherein the communication break has occurred.

14. A method of monitoring the connection between a monitoring center and a monitored premises comprising (a) providing a monitoring center, (b) providing a plurality of monitored premises each having sensor means connected to an interface at said premises, (c) providing a signalling point (SP) connected to said interface via digital data link means, (d) continuously conducting loop back testing of said data link means between said SP and said interfaces to detect any interruption of said data link means, (e) providing interruption detection means at said SP to provide an interruption signal to identify any said interruption of said data link means, (f) providing processor means connected to said SP for receiving said interruption signal and for providing a trouble signal identifying said data link means and in response to said interruption signal, (g) transmitting said trouble signal from said processor means to said monitoring center.

15. A method according to claim 14 wherein said interruption detection means is a Master Control Center (MCC) disposed at said SP.

16. A method according to claim 15 wherein said processor means are disposed at a Switching Control Center (SCC) connected to said MCC.

17. A method according to claim 16 further comprising providing a plurality of said SP, providing one of said MCC for each said SP, and wherein one said SCC is connected to a plurality of said MCC.

18. A method according to claim 14 wherein said processor means are disposed at said SP and are connected to an SS7 network, and wherein said transmitting step comprises transmitting said trouble signal through said SS7 network.

19. A method according to claim 14 wherein said transmitting step comprises said processor auto-dialing said monitoring center.

20. A method according to claim 14 further comprising connecting said SP to other SPs via trunks, detecting any interruption of communication through said trunks, said interruption detection means providing a second interruption signal to identify said interruption of communication through said trunks, said processor means providing a second trouble signal in response to said second interruption signal, and transmitting said second trouble signal from said processor means to said monitoring center.

21. A method according to claim 14 wherein said SP is connected to said monitoring center through a Public Switched Telecommunications Network (PSTN).

22. A method according to claim 14 wherein said data link means comprises an ISDN link including at least one B and one D channel.

* * * * *

UNITED STATES PATENT AND TRADEMARK OFFICE
CERTIFICATE OF CORRECTION

PATENT NO.    : 5,426,688
DATED         : June 20, 1995
INVENTOR(S)   : Anand

It is certified that error appears in the above-identified patent and that said Letters Patent is hereby corrected as shown below:

Column 1, line 62, "such a private" should read --such as private--.

Column 8, line 43: claim 1 (f), line 3, "one of said a data link" should read --one of said data link--.

Column 8, line 48: claim 1 (g), line 3, "said said interruption" should read --said interruption--.

Signed and Sealed this

Nineteenth Day of September, 1995

Attest:

BRUCE LEHMAN

Attesting Officer

Commissioner of Patents and Trademarks